April 13, 1937.  J. EDGAR  2,077,100

GRINDING ELEMENT FOR AND METHOD OF MAKING SPLINE COUPLINGS

Filed Feb. 25, 1933  2 Sheets—Sheet 1

INVENTOR
John Edgar
BY
Chindall, Parker & Carlson
ATTORNEYS

April 13, 1937.    J. EDGAR    2,077,100
GRINDING ELEMENT FOR AND METHOD OF MAKING SPLINE COUPLINGS
Filed Feb. 25, 1933    2 Sheets-Sheet 2

INVENTOR
John Edgar
BY
Chindall, Parker & Carlson
ATTORNEYS

Patented Apr. 13, 1937

2,077,100

UNITED STATES PATENT OFFICE 2,077,100

GRINDING ELEMENT FOR AND METHOD OF MAKING SPLINE COUPLINGS

John Edgar, Rockford, Ill., assignor to Barber-Colman Company, Rockford, Ill., a corporation of Illinois Application February 25, 1933, Serial No. 658,506

7 Claims. (Cl. 51—278)

The present invention relates to a new and improved grinding element adapted for grinding the interdental spaces defining the keys of the inside members of multiple-key spline couplings, and to a novel method utilizing the grinding element for making such couplings.

A general object resides in the provision of a novel rotary grinding element having a peripheral helical abrasive thread adapted particularly for grinding, on the inside member, the seating or wedge surfaces, of interdental spaces varying in cross-section along their length, which are to be engaged by interfitting surfaces in the outside member.

A more specific object is to provide a new and improved tapered grinding element adapted for finish grinding an inside member comprising a plurality of parallel, equally peripherally spaced keys, uniform in width throughout their length and separated by interdental spaces with root surfaces that are arcuate in cross-section and uniformly and equally tapered toward the axis of rotation to constitute spaced segments of a conical base for the keys.

Another object resides in the provision of a novel method of making the inside member of a multiple-key spline coupling in which the inside member and the grinding element are rotated in timed relation, and in which the grinding element is fed relatively along a path extending across the axis of the inside member and at an angle to the axis of the grinding element, through cutting engagement with the inside member, so that the longitudinal form of the grinding element will be projected along said path to produce a foreshortened form progressively along the axis of the inside member.

Other objects and advantages will become apparent as the description proceeds.

The invention is illustrated in the accompanying drawings, in which.

Figure 1:
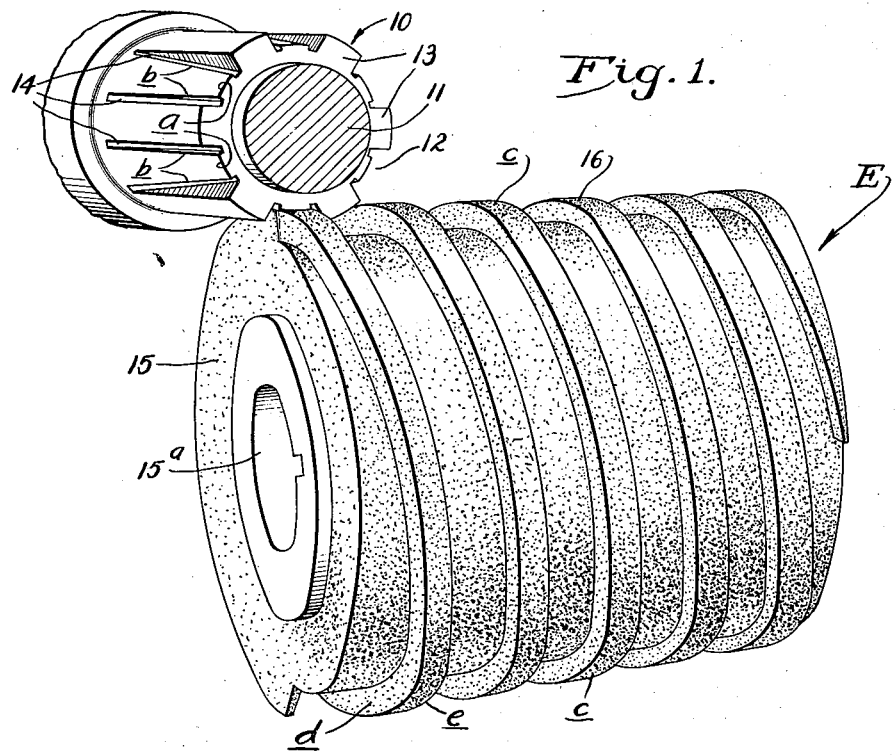
Figure 1 is a perspective view of a grinding element shown in relation to the inside member at the start of the grinding operation.

Within the broad aspects of the invention, neither the grinding element nor the method is limited to the production of any specific inside member, but may be varied to adapt it to the individual form of any one of a variety of inside members. However, for purposes of illustration, the invention is described in connection with an inside member of the form shown in Fig. 1. This inside member consists of a cylindrical shaft section 10 having a reduced threaded extension 11 adapted to receive a suitable nut (not shown).

Formed in the section 10 are a plurality of equally peripherally spaced, generally longitudinal interdental spaces 12 which define a like number of integral spline keys 13. Preferably, the sides of each key 13 are parallel to each other and to the axis of rotation, and hence the sides of each space 12 converge laterally and inwardly. It will be evident that the outer edges of the keys 13 are parallel, and that the tops of the keys constitute spaced segments of the external cylindrical form of the section 10.

The root surfaces $a$ of the spaces 12 are arcuate in cross-section, and uniformly and equally inclined toward the axis of rotation to constitute spaced segments of a conical base for the keys 13. Due to the longitudinal taper of the root surfaces $a$, the side edges $b$ thereof converge longitudinally and inwardly. Preferably, clearance grooves 14 are formed in the spaces 12 along the side margins of the root surfaces $a$.

The present invention is not directed to the method of making the outside member (not shown) of the spline coupling. It is sufficient to say that any suitable outside member adapted to receive the splined shaft section 10, and having keyways and projections adapted to interfit respectively with the keys 13 and spaces 12 and to seat snugly on the root surfaces $a$ may be provided.

Preferably, the spaces 12 are produced by a generating or hobbing method which makes possible the formation of the keys 13 integral with the shaft section 10 without encountering interference even though the root surfaces $a$ converge in width. Generated keys 13 are correctly formed and accurately spaced even though the radius of the root surfaces $a$ changes along the conical taper. A suitable generating or hobbing method is disclosed in my copending application, Serial No. 554,645, filed August 3, 1931, (Patent No. 1,905,278).

The present invention relates to a grinding element E for finish grinding the seating surfaces of the inside member. In the specific member herein illustrated, these seating surfaces are the root surfaces $a$. The grinding element adapted for grinding the root surfaces $a$, in its preferred form, has a cylindrical abrasive body 15 formed with an axial bore 15ª. Any suitable number of abrasive threads may be formed on the body 15. Preferably, a single helical thread 16 of constant lead and a plurality of convolutions is provided.

Figure 4:
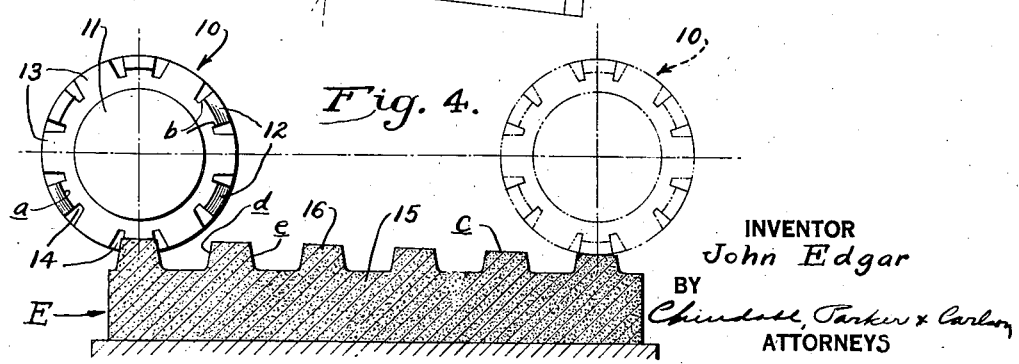
Fig. 4 is a fragmentary axial sectional view of the grinding element shown in operative relation to the work.

The thread 16 is uniformly tapered in height along its length relative to the axis of rotation. Preferably, the thread 16 is uniform in width along its length at any fixed distance from the axis of rotation, so that the top surface $c$ tapers gradually and uniformly in width toward the large end of the grinding element. So as to generate the root surfaces $a$ with a true arcuate form concentric with the axis of rotation, the top surface $c$ of the thread 16 is laterally inclined in accordance with the taper of the grinding element. Hence, in any axial plane (see Fig. 4), the top surface $c$ comprises a series of spaced straight-line elements coincident with the taper of the grinding element.

Preferably, the taper or inclination of the root surfaces $a$ toward the axis of the member 10 is gradual, for example less than 15°, so that the outside member will engage therewith at an angle affording a wedging action. In this event, the longitudinal taper of the abrasive thread 16 also is gradual so that its projected form along the contemplated path of feeding movement will coincide with the taper of the member 10 as hereinafter described.

The specific form of grinding element illustrated herein is intended only for finishing the root surfaces $a$. Hence, the top surface $c$ of the thread 16 must have a width at any point along its length at least as great as that of the root surfaces $a$, and less than that of the bottom of the spaces 12, at the corresponding point along the axis of the member 10. By reason of the clearance grooves 14, sharp edges can be produced along the side margins of the root surfaces $a$, in a generating action both in hobbing and grinding, and the taper in the width of the top surface $c$ of the thread 16 can be out of correlation with the taper in width of the root surfaces, without resulting in interference with the sides of the keys 13. In other words, the top surfaces $c$ can be of any width equal to or greater than that of the root surfaces $a$ between the grooves 14 and narrow enough to avoid interference with the sides of the keys 13. Hence, it is possible, by varying the relative components of movement in the method as hereinafter described, to use one grinding element for grinding root surfaces $a$ of different lengths and degrees of inclination relative to the axis of the section 10.

Since the side surfaces $d$ and $e$ of the thread 16 are not intended to contact with the sides of the keys 13, they may have any suitable form which will avoid interference. Preferably, the side surfaces $d$ and $e$ are substantially symmetrical in any axial plane about a perpendicular to the axis of rotation, i. e. have line elements of inverse form. In the present instance, the side surfaces $d$ and $e$ have straight-line generatrixes which intersect the axis of rotation and which in any axial plane are equally and oppositely inclined relative to said axis to converge outwardly. It will be understood that where the side surfaces of the thread 16 are to grind the sides of the keys 13, they must be properly shaped so as to generate the desired form, and the width of the thread must be accurately correlated to the width of the spaces 12. In the present instance, the side surfaces $d$ and $e$ would have to be involutes to grind the flat sides of the keys 13.

In carrying out the method of making the inside member of the spline coupling, first the section 10 is produced in the form described. Preferably, this is accomplished by hobbing the section 10 in the manner disclosed in my copending application.

The spline section 10 is now finish ground by means of the grinding element E.

Figure 3:
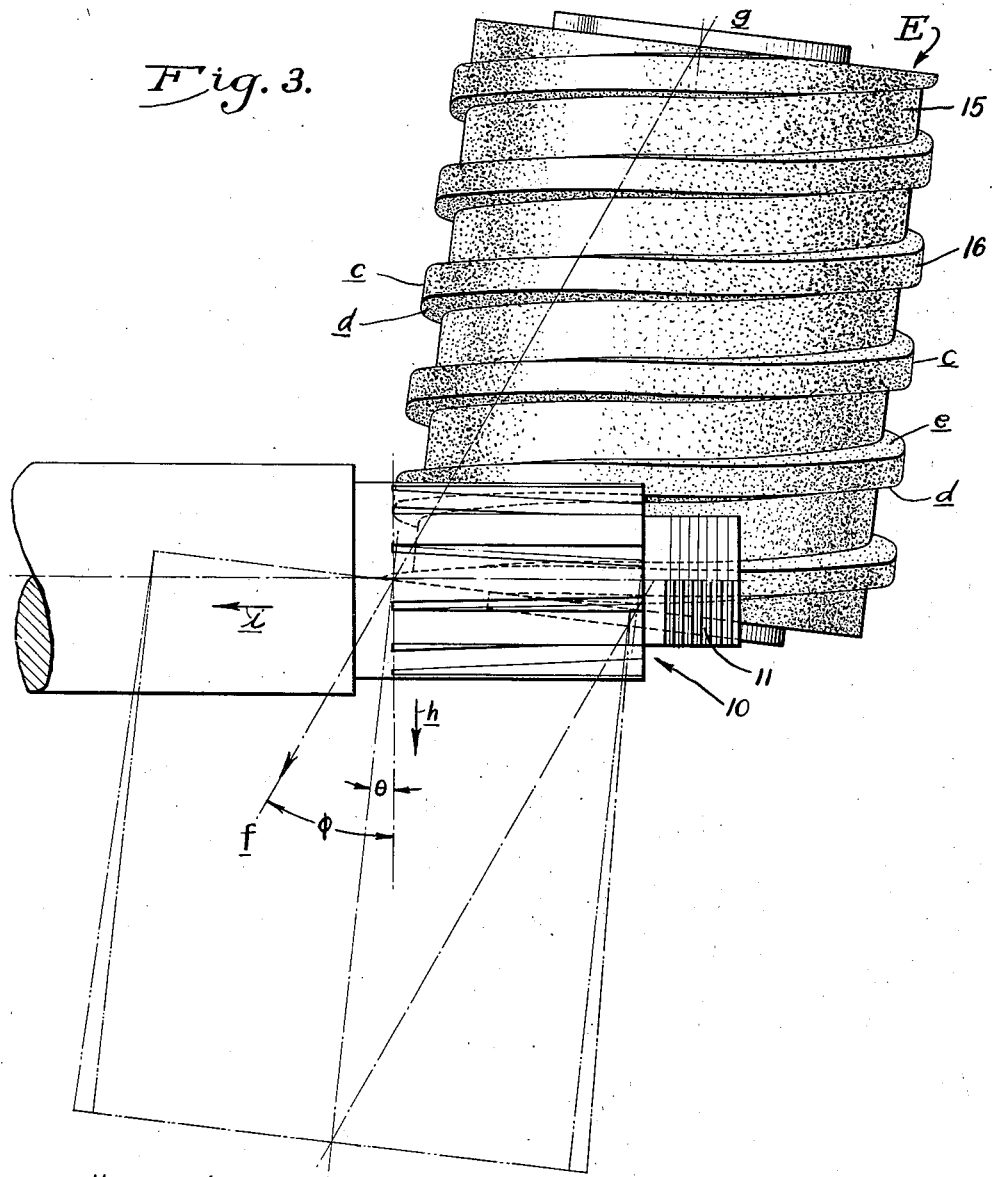
Fig. 3 is a diagrammatic view illustrating the method of grinding the inside member.

The grinding method comprises initially positioning the element E at one side of the axis of the section 10. For straight keys 13, the grinding element E is axially inclined to a perpendicular to the axis of the section 10 at an angle $\theta$ corresponding to the thread angle. Assuming that the cut is to proceed from the deep ends of the slots 13 progressively toward the shallow ends, the large end of the grinding element E is positioned in the lead. The grinding element E is located longitudinally of the member 10 at a point such that its longitudinal form when projected along the contemplated path of relative feeding movements, at an angle to its axis, will describe a foreshortened form along the axis of the member coincident with the form to be produced. Preferably, the path of feeding movement, indicated by the line $f$—$g$, is inclined at an angle $\phi$ to extend diagonally across the axis of member 10 so that the grinding element E initially is located at the side and off one end of the key zone as indicated in full outline in Figs. 3 and 4.

The member 10 and the grinding element E now are rotated in proper timed relation, and relatively fed gradually through grinding engagement along the oblique rectilinear path $f$—$g$. At the end of the feeding movement, the grinding element E will occupy the position indicated in dotted outline in Fig. 3, and the member 10 will be in the position shown in dotted outline in Fig. 4.

If the grinding cut were to proceed from the shallow ends toward the deep ends of the slots 13, the foregoing operation would be reversed. Thus, the grinding element E initially would occupy the position shown in dotted outline in Fig. 3, with the small end in the lead, and would be fed relatively in the opposite direction along the path $f$—$g$.

The diagonal cross feed may be resolved into two components, one perpendicular to the member 10 in the direction of the arrow $h$, and the other longitudinally of the member along the arrow $i$. If the grinding element E were to be used for a member 10 having a longer key zone, the longitudinal component $i$ would be correspondingly increased so that the path $f$—$g$ would be inclined at a greater angle $\phi$ to the perpendicular component $h$.

Figure 2:
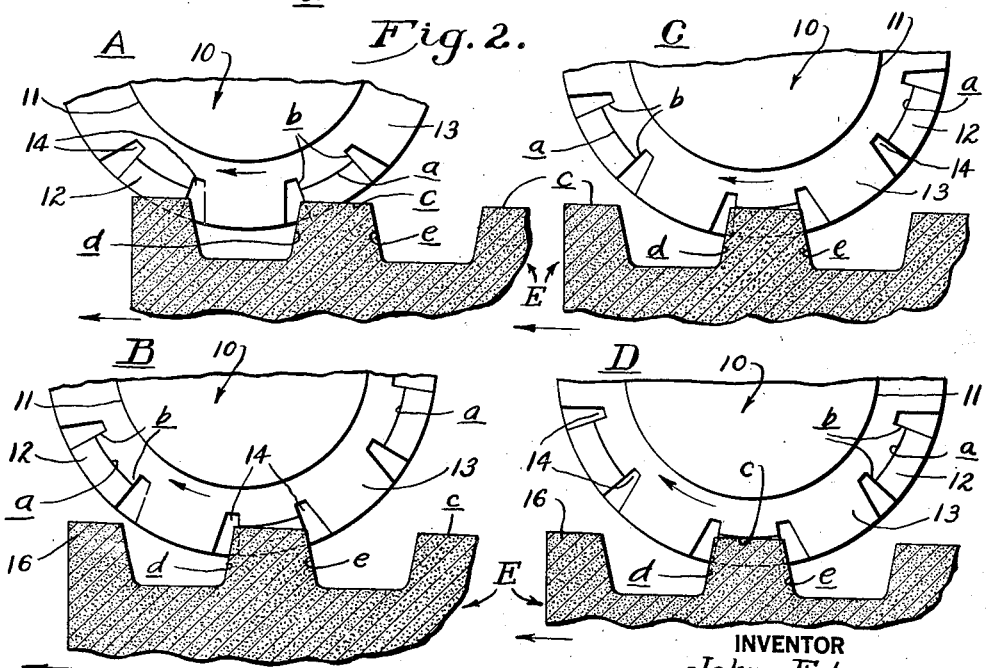
Fig. 2 is a diagrammatic view taken axially of the inside member, and illustrating at A, B, C and D progressive stages of the generation of the root surfaces in the grinding operation.

The diagonal cross feed effects a rolling or generating action, as clearly illustrated in successive stages at A, B, C and D in Fig. 2. Thus, at A, grinding contact has not been established. At B, the abrasive thread 16 has just contacted the leading edge of the root surface $a$. In the continued movement of the root surface $a$ and the top surface of the thread 16, the point of engagement or tangency shifts progressively across the surface as indicated at C and D. The line of grinding contact extends diagonally across the root surface $a$, and the cut to depth advances progressively along the surface.

It will be evident that the root surfaces $a$ will be ground accurately to the desired form. The method is simple and expeditious, and adaptable to the production of members 10 of different specific forms and dimensions.

I claim as my invention:

1. An externally tapered rotary grinding element for finish grinding a cylindrical shaft section having a plurality of like, peripherally spaced longitudinal keys of uniform width throughout their lengths and separated by elongated spaces with root surfaces which are inclined to the axis of the shaft and constitute spaced segments of a conical base for said keys concentric to said axis, and which have clearance grooves along their side margins, said element comprising a cylindrical body, and a substantially uninterrupted helical abrasive thread of uniform lead on the periphery of said body, said thread along its length being uniform in width at the pitchline and uniformly tapered in height relative to the axis of said body, said width being less than the minimum width of said spaces and as great as the maximum width of said root surfaces between said grooves, the top surface of said thread being laterally inclined to define the external axial taper of the grinding element.

2. An externally tapered rotary grinding element for finish grinding a shaft section having a plurality of like, equally and peripherally spaced, longitudinal keys separated by elongated spaces with root surfaces which are inclined to the axis of the shaft and constitute spaced segments of a conical base for said keys concentric to said axis, said element comprising a body, and a substantially uninterrupted helical abrasive thread of uniform lead and pitch on the periphery of said body, said thread along its length being uniform in width at a fixed radius and less in width than one-half the pitch and uniformly tapered in height relative to the axis of said body, the top surface of said thread having straight line elements in any axial plane coincident with the external axial taper of the grinding element.

3. The method of making the inside member of a spline coupling having a plurality of similar, equally and peripherally spaced, generally longitudinal keys of uniform width throughout their length and separated by elongated spaces with root surfaces which are laterally arcuate about the axis of said member and longitudinally inclined to said axis to constitute spaced segments of a conical base for said keys concentric to said axis and which have clearance grooves along their side margins, said method comprising providing an axially tapered hob having a series of relieved cutting teeth arranged in a peripheral helical thread of uniform lead extending through a plurality of convolutions, said thread being uniform in width at the pitch line and longitudinally tapered in height relative to the hob axis along its length, the tops of said teeth in any axial plane being laterally inclined to coincide with the external taper of said hob, said teeth having lugs along the side margins of said tops, positioning said hob with its axis at an angle to a perpendicular to said member corresponding to said lead and with the large end thereof off the end and at one side of said member, rotating said member and said hob in timed relation, during said rotation relatively feeding said hob in a rectilinear path inclined to said hob axis and extending diagonally across said member through cutting engagement with said member, providing an externally tapered rotary grinding element having on its periphery a helical abrasive thread of uniform lead equal to the thread lead of said hob, said abrasive thread having a width at the pitch line less than the minimum width of said spaces and as great as the maximum width of said root surfaces between said grooves and being tapered in height along its length relative to the axis of said element at the same degree as said hob thread, the top surface of said abrasive thread having straight-line elements in any axial plane coincident with the external axial taper of said element, positioning said element in the same manner as said hob, rotating said member and said element in the same timed relation as said member and said hob, and feeding said element relatively through said path to finish grind said root surfaces between said grooves.

4. The method of making the inside member of a spline coupling having a plurality of similar, equally and peripherally spaced, generally longitudinal keys of uniform width throughout their length and separated by elongated spaces with root surfaces which are laterally arcuate about the axis of said member and longitudinally inclined to said axis to constitute spaced segments of a conical base for said keys concentric to said axis, and which have clearance grooves along their side margins, said method comprising hobbing said member to produce said keys, spaces, root surfaces and grooves, providing an axially tapered rotary grinding element having a helical abrasive thread of uniform lead extending through a plurality of convolutions, said thread having a width at the pitch line less than the minimum width of said spaces and as great as the maximum width of said root surfaces between said grooves and being tapered in height along its length relative to its axis, the top surface of said thread being laterally inclined to coincide with the external taper of said element, positioning said element with its axis at an angle to a perpendicular to said member corresponding to said lead, rotating said member and said element in timed relation, and during said rotation relatively feeding said element in a rectilinear path inclined to its axis and extending diagonally across said member through cutting engagement with said member to finish grind said root surfaces between said grooves.

5. The method of making the inside member of a spline coupling having a plurality of similar, equally and peripherally spaced, generally longitudinal keys of uniform width throughout their length and separated by elongated spaces with root surfaces which are laterally arcuate about the axis of said member and longitudinally inclined to said axis to constitute spaced segments of a conical base for said keys concentric to said axis, said method comprising hobbing said member to produce said keys, spaces and root surfaces, providing an axially tapered rotary grinding element having a peripheral helical abrasive thread of uniform lead extending through a plurality of convolutions, said thread being tapered in height along its length relative to its axis, the top surface of said thread being laterally inclined to coincide with the external taper of said element, positioning said element with its axis at an angle to a perpendicular to said member corresponding to said lead, rotating said member and said element in timed relation, and during said rotation relatively feeding said element in a path inclined to its axis and extending across the axis of said member through cutting engagement with said member to finish grind said root surfaces.

6. The method of making the inside member of a spline coupling having a plurality of similar, equally and peripherally spaced, generally longitudinal keys of uniform width throughout their length and separated by elongated spaces with root surfaces which are laterally arcuate about the axis of said member and longitudinally inclined to said axis to constitute spaced segments of a conical base for said keys concentric to said axis, said method comprising providing an axially tapered rotary grinding element having a peripheral helical abrasive thread of uniform lead extending through a plurality of convolutions, said thread being tapered in height along its length relative to its axis, the top surface of said thread being laterally inclined to coincide with the external taper of said element, positioning said element with its axis at an angle to a perpendicular to said member corresponding to said lead, rotating said member and said element in timed relation and during said rotation relatively feeding said element in a path inclined to its axis and extending across the axis of said member through cutting engagement with said member to finish grind said root surfaces.

7. An externally tapered rotary grinding element for finish grinding a cylindrical shaft section having a plurality of peripherally spaced generally longitudinal keys separated by elongated spaces with root surfaces that are inclined to the axis of the shaft and constitute spaced segments of a conical base for said keys concentric to said axis, said element comprising a rotary body, and a substantially uninterrupted helical abrasive thread of uniform lead on the periphery of said body, said thread tapering in height relative to the axis of said body and having a width less than the minimum width of said spaces, the top surface of said thread being laterally inclined to define the external axial taper of the element, the convolutions of said thread defining a helical space adapted to provide free clearance for said keys.

JOHN EDGAR.